3,327,600
REFLEX CAMERA VIEWFINDER WITH
PHOTOCELL
Werner Trankner, Dresden, Germany, assignor to VEB
Pentacon Dresden Kamera- und Kinowerke, Dresden,
Germany
Filed July 12, 1965, Ser. No. 471,332
4 Claims. (Cl. 95—42)

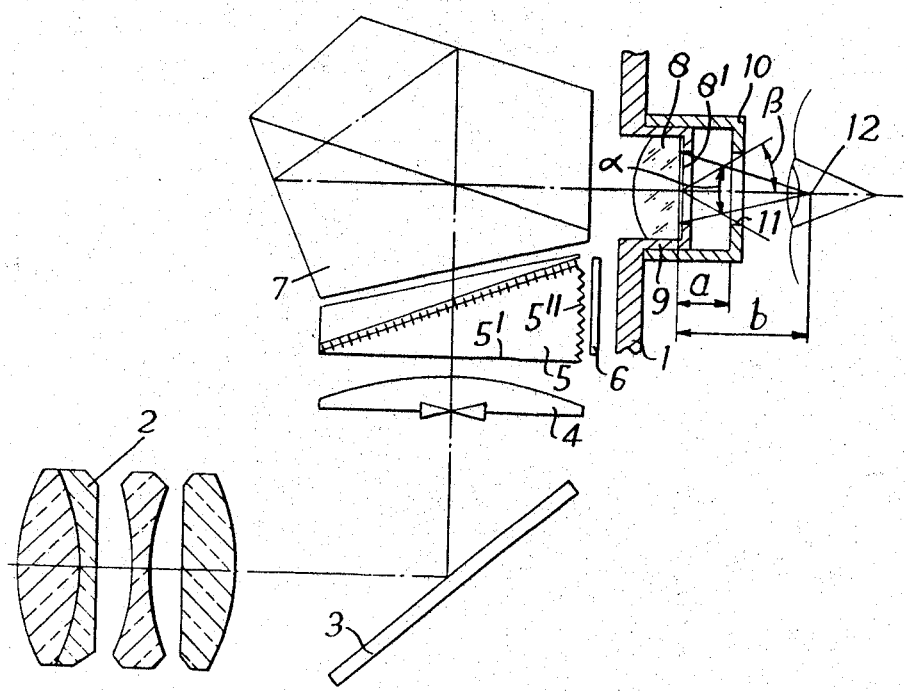

The invention relates to a view finder device for mirror reflex cameras, which is equipped with an internal photoelectric exposure arrangement.

Arrangements are already known with which the attempt has been made to screen off the extraneous light penetrating from the eyepiece lens into the view finder system and reaching the photoelectric element or to compensate for the errors in measurement which result therefrom. However, it has been found in practice that these arrangements do not conform to the standards which are required.

Furthermore, an attempt has been made to overcome this defect by eye guards or cups which can be fitted on to the eyepiece, the said guards or cups additionally being provided with a mechanism which can be closed and which opened automatically by pressure of part of the face or head against the said eye guard. However, also when using eye guards of this type, there is not in every case a firm contact between a part of the eye and the eye guard on looking into the view finder: for example, with a person wearing spectacles, because of the spaces between the eye, spectacles and eye guard, such a large amount of obliquely incident extraneous light penetrates, especially with strong overhead illumination, that the measurement result is disadvantageously influenced. Apart from the displeasing and bulky form of an eye guard, the latter is not always available, especially when the picture-taking camera is carried in an ever-ready case, which presents difficulties as regards the fitting of an eye guard.

The object of the invention is to avoid both the additional expense of an eye guard and also costly, complicated means inside the camera for compensating for the error in measurement due to incident extraneous light during the exposure measurement. The purpose of the invention is therefore to construct the view finder device for mirror reflex cameras in such a way that, on looking into the view finder, no extraneous light which would disturb the exposure measurement penetrates from the eyepiece side into the view finder device.

This object is achieved by the invention by the fact that, following the last glass surface of the eyepiece, a diaphragm or mask is arranged with an air gap on the camera housing, which diaphragm is so dimensioned and spaced from the eyepiece that the tangent of half the angle substended by the aperture of said diaphragm from the intersection of the optical axis with the point of exit of the light ray from the eyepiece is not greater than four (4) times the tangent of half the angle subtended by the exit aperture of the eyepiece from the point of sight located on the optical axis of said eyepiece.

Half the diaphragm aperture angle ($\beta$), starting from the point of impact of the optical view finder axis on the last glass surface of the eyepiece, is limited by the diaphragm aperture. $\alpha$ represents half the image angle for the eye, starting from the point of sight (retina). By way of amplification, it is to be pointed out that $\tan \alpha$ can be mathematically substituted by the relationship of the view finder magnification and the image aperture size.

The advantages resulting from the invention are to be seen in a simple, space-saving arrangement, without the photographer being hindered when carrying the camera or without an additional eye guard being necessary. It is quite conceivable to construct the diaphragm according to the invention so that it can also be detached from the camera housing, and in addition the diaphragm can be provided with a screwthread, bayonet connection or a clamping device, so that other parts necessary for looking into the view finder e.g. eye-correction lenses, filters or the like, can be fixed on the diaphragm.

The invention is illustrated and described by reference to one constructional example: within a camera housing 1, only part of which is shown, a reflex mirror 3 is arranged in the path of rays of the objective 2, and above the said mirror is an image field lens 4, a beam-dividing prism 5 which consists of two elements, a photoelectric element or a photoresistance 6 being arranged on one side of the prism, and also a roof-edged pentaprism 7 and an eyepiece 8.

The beam dividing prism 5, whose light entry surface 5' is at right angles to the plane of the film, consists of a semi-permeable mirrored wedge prism pair which is provided to direct part of the light coming from the objective 2 to the photo-cell 6 or photo-resistance. The prism pair can be arranged in the path of the light rays either cemented or separated by an air gap, so that light rays reflected from the hypotenuse surface of the prism pair reach the side surface 5" of the prism adjacent the photo resistance 6 without total reflection, the surface 5" is provided with prismatic projections.

A diaphragm 10 is arranged to be fixed around or detachable from the eyepiece mount 9.

An air gap $a$ exists between the diaphragm aperture 11 and the last lens surface 8' of the eyepiece 8. The aperture angle of the diaphragm 10 is determined by the angle subtended by the aperture of said diaphragm from the inter-section of the optical axis with the point of exit of the light ray from the surface 8' of the eyepiece 8 and the image angle is determined by the angle subtended by the exit aperture of the eyepiece from the point of sight 12 located on the optical axis of said eyepiece. The size of the diaphragm aperture 11 depends on both the tangent of the half aperture angle $\beta$ and on the air gap $a$, the minimum air gap ($a_{min}$) being $b/5$, $b$ being the eye spacing which extends from the point of sight 12 to the exit surface 8' of the eyepiece 8. The maximum half aperture angle $\beta$ at the diaphragm 10 is obtained when $\tan \beta = 4 \cdot \tan \alpha$.

If the diaphragm 10 were omitted there would be a considerably larger angle $\beta$ for the light entering the eyepiece 8. This would mean that an undesirable larger portion of light could enter the view finder. This can be proved by experiment.

The invention is not limited to the constructional example which has been illustrated. It is quite conceivable that the photoelectric element or the photo resistance 6 can be arranged at a quite different position, outside or inside the path of view finder rays. However, while looking into the view finder, it is not possible in any case for such a quantity of extraneous light to enter the path of view finder rays through the eyepiece as to be able to falsify the measurement result during the measuring operation. Even when taking photographs against the light with high illumination densities on the head of the photographer and low illumination densities of the subject to be measured, the proportion of extraneous light which is for example reflected by a small amount of scattered light from the eye of the viewer and penetrates with a small angle near the view finder axis into the view finder system, is negligibly small.

I claim:
1. A view finder for a mirror reflex camera having a housing and a light-measuring device including a photo cell arranged therein, comprising an objective, an eyepiece arranged on the light ray path from said objective, means between said objective and eyepiece for directing a portion of the light entering said view finder to said photo cell, and an apertured diaphragm attached to said housing on the optical axis of said eyepiece and so dimensioned and spaced from said eyepiece that the tangent of half the angle $\beta$ subtended by the aperture of said diaphragm from the intersection of the optical axis with the point of exit of the light ray from the eyepiece is not greater than four (4) times the tangent of half the angle $\alpha$ subtended by the exit aperture of the eyepiece from the point of sight located on the optical axis of said eyepiece.

2. In a photographic monocular reflex camera having a housing containing a photo-electric light measuring device and having in said housing in the direction of the light ray path, an objective, a pivotable reflex mirror, means for deflecting a portion of the light from the object to be photographed to said photo-electric light measuring device, a roof-edged pentaprism, an eyepiece and an apertured diaphragm arranged on the optical axis of said eyepiece and so dimensioned and spaced from said eyepiece that the tangent of half the angle subtended by the aperture of said diaphragm from the intersection of the optical axis with the point of exit of the light ray from the eyepiece is not greater than four (4) times the tangent of half the angle subtended by the exit aperture of the eyepiece from the point of sight located on the optical axis of said eyepiece.

3. A photographic monocular reflex camera according to claim 1, wherein the diaphragm is detachably mounted on said housing.

4. A photographic monocular reflex camera according to claim 1, wherein the diaphragm is displaced from the eyepiece by a minimum distance of one fifth of the distance between the eyepiece and the point of sight.

References Cited

UNITED STATES PATENTS 3,264,964   8/1966   Ebertz   95—42

JOHN M. HORAN, *Primary Examiner.*